Patented Dec. 13, 1949

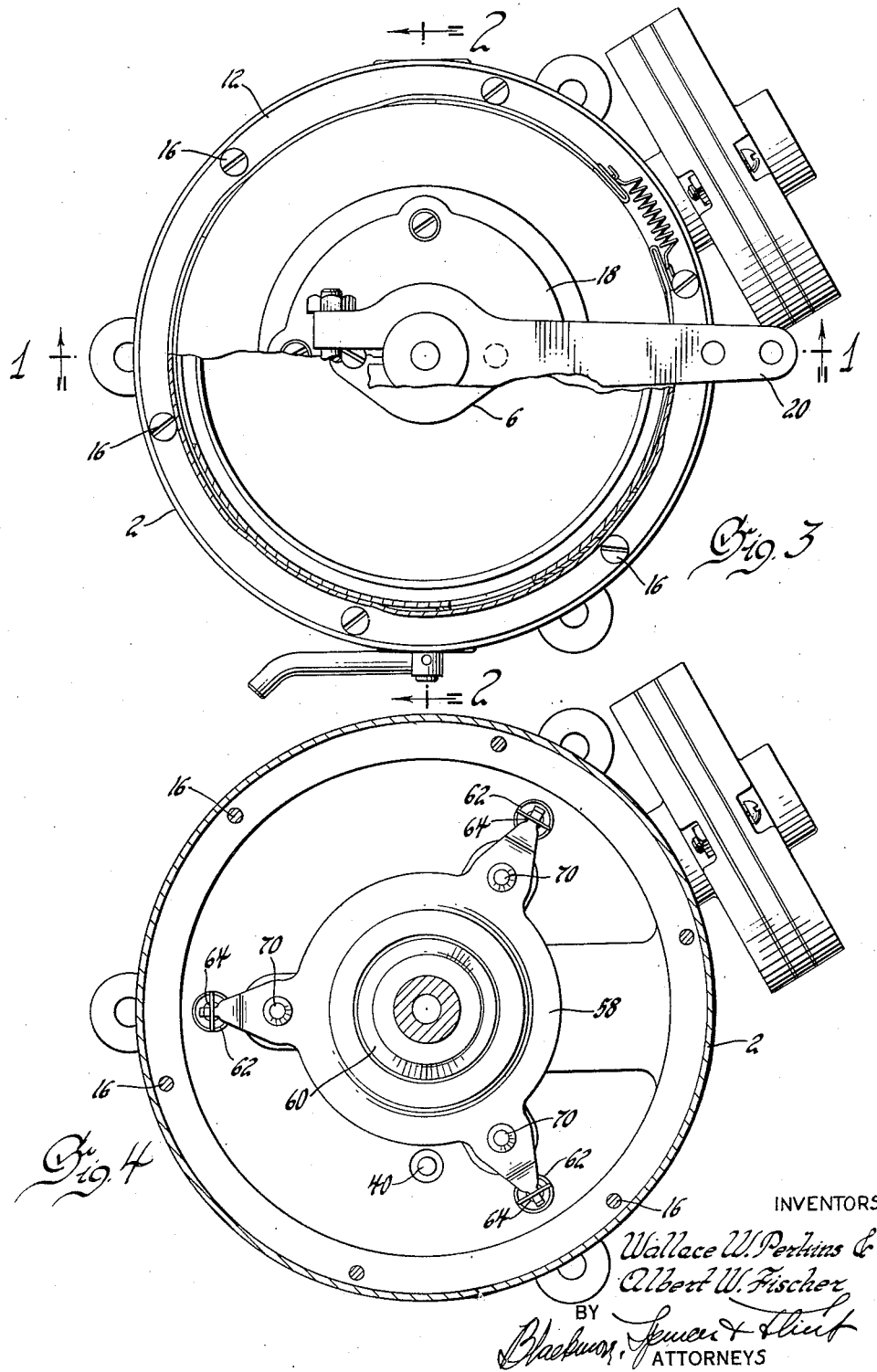

2,491,204

UNITED STATES PATENT OFFICE 2,491,204

DIRECTIONAL GYROSCOPE

Wallace W. Perkins, Pleasant Ridge, and Albert W. Fischer, Detroit, Mich., assignors to General Motors Corporation, Detroit, Mich., a corporation of Delaware Application February 2, 1945, Serial No. 575,868

4 Claims. (Cl. 74—5.14)

This invention relates to gyroscope control means and more specifically to means for caging and centering a gyroscope. Due to the fact that gyroscopic means frequently have to be reset due to precession and other causes which tend to misalign the same, it is necessary to provide caging means which can be easily and quickly operated to correct any tilt of the inner gimbal and in some instances at the same time bring it back to a neutral or central position.

It is therefore an object of our invention to provide caging and centering means for a gyroscope.

It is a still further object of our invention to provide centering and caging means which can easily be applied to a conventional gyroscope without any appreciable alteration.

It is a still further object of our invention to provide centering and caging means for a gyroscope which may be operated from a remote point.

With these and other objects in view which will become apparent as the specification proceeds, our invention will be best understood by reference to the following specification and claims and the illustrations in the accompanying drawings, in which:

Figure 3 is a top plan view of Figure 1 with parts broken away and in section.

Figure 4 is a view taken on line 4—4 of Figure 1 with cover and gyroscope removed and parts shown in section.

Figure 1:
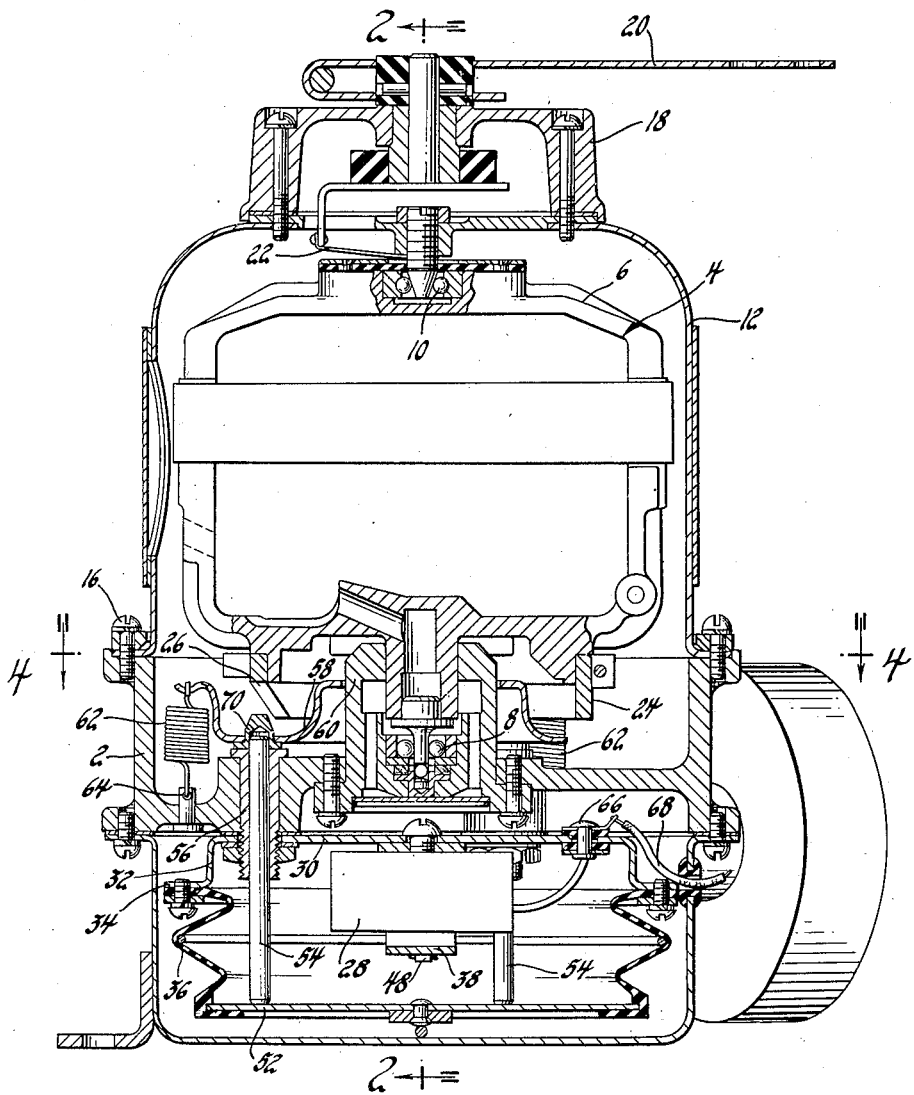
Figure 1 is a vertical section taken through a gyroscope and control embodying our invention taken on line 1—1 of Figure 3.
Figure 2:
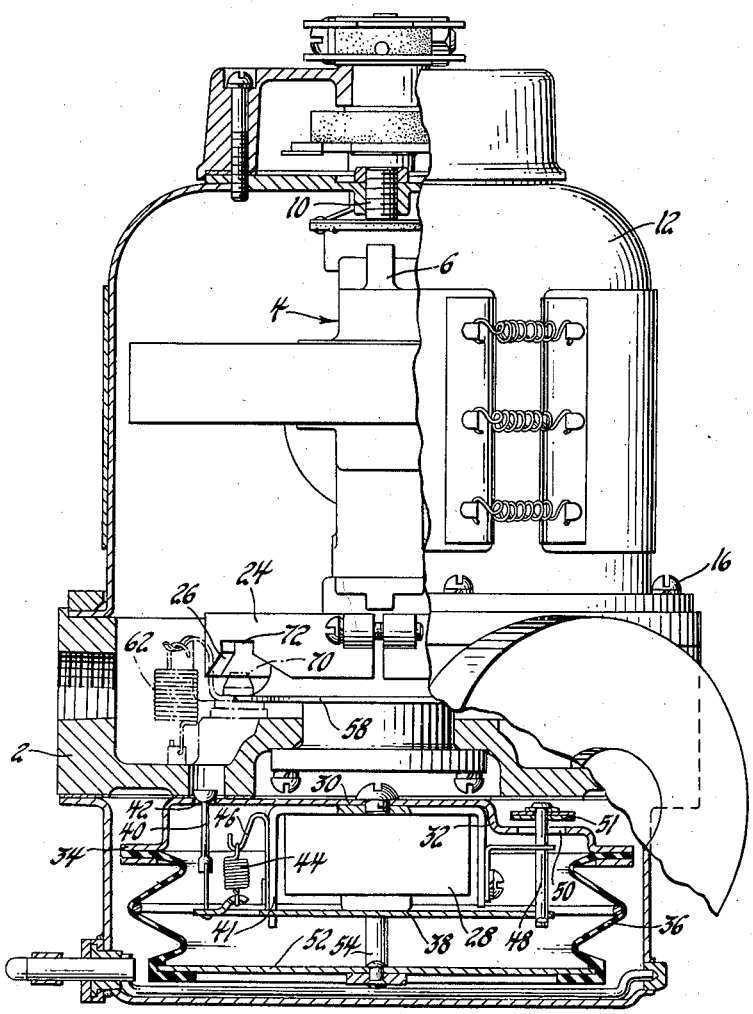
Figure 2 is a vertical sectional view at right angles to the view shown in Figure 1 taken on line 2—2 of Figure 3.

Referring now more specifically to the drawings, there is shown therein a base member 2 which rotatably supports a gyroscope indicated generally at 4 whose outer gimbal 6 is vertically pivoted in bearing members 8 and 10 to rotate about a vertical axis. A bell housing 12 is secured to the base 2 by suitable means such as cap screws 16 to encase the gyroscopic means. A cap 18 is carried upon the outer end of the bell housing and pivotally supports a follow up controlled arm 20 mechanically attached to a servo or control motor. Take off switch arm 22 mechanically attached to arm 20 controls direction of servo motor.

A ring 24 is supported on the under-surface of the gimbal ring 6, said ring having in one portion thereof two tapered surfaces such as 26 which provide for centering when the caging member is raised. The means for operating the caging means is shown generally in the lower portion of the device and comprises an electrical relay 28 supported by a cross plate 30 secured to the base 2. The plate 30 has its edge bent vertically as at 32 and then again horizontally to form a cylindrical flange 34 which supports the periphery of a bellows 36.

Mounted below the relay 28 is a movable transverse armature plate 38 which carries on one end a vertical valve 40 which extends up through an opening 42 into the housing encasing the gyroscope. Thus, when this valve is opened the pressure between these two chambers may be equalized, but when closed different pressures may occur. The small tension spring 44 is connected to the plate at a position adjacent the valve 40 having its other end anchored to member 46 extending from the side of the relay housing. The opposite end of the bar 38 carries a second vertical rod 48 which in like manner extends up through an opening 50 in the plate 30 which interconnects the interior of the bellows to atmosphere.

The end plate 52 of the bellows is in contact with several vertical push rods 54 which extend upwardly through sleeves 56 to force upwardly a cylinder adjusting drum 58 which slides on the cylinder 60. This drum 58 is spring biased downwardly by a tension spring 62 anchored to the frame through part 64, the opposite end of the spring engaging the drum 58. A terminal 66 is insulatedly mounted in the plate 30 and is connected to an exterior line 68 through which the relay coil may be energized.

Under normal operation the interior of the housing 12 within which the gyroscope is located will be maintained below normal pressure or at a vacuum from a suitable source. When it is desired to cage or reset the gyroscope with respect to the ship, the circuit through the relay coil 28 is broken, either through remote control or by a hand operated switch. Spring 44 then causes bar 38 to move about its pivot 41, lifting valve 42 to open the bellows compartment to the reduced pressure in bell housing 12 and at the same time closing valve 51 by its action on 48. This causes the bellows to contract, the end plate 52 forcing the pins 54 upwardly and that in turn raising the drum 58 and causing projection 70 to ride against the tapered surface 26 of the under surface of the ring 24. This therefore forces the ring and the gyroscope as a whole upwardly to lock the same and cause it to turn in either direction depending upon the point at which the projection 70 engaging the tapered surface until the projection enters the indexing notch 72. At this point the gyroscope gimbal housing has been returned to its original position with respect to the casing and the directional control may be resumed. The relay is then de-energized, whereupon the armature 48 falls away closing valve 42 permitting the bellows to again expand and the gyroscope to resume its control operation.

We claim:

1. In control means for a gyroscope, a recessed centering ring located on a gimbal ring of said gyroscope, a pin axially movable into engagement with the recess of said ring to index the same, a bellows engaging the pin to move the same, a chamber around the gyroscope adapted to be evacuated, a passage from said bellows to the chamber, a valve controlling the flow of fluid from the bellows to the chamber, a vent from the bellows to the atmosphere, a second valve controlling the flow of fluid through this vent, and an electromagnet controlling the two valve positions.

2. In control means for a gyroscope, a recessed centering ring located on a gimbal ring of said gyroscope, a pin axially movable into engagement with the recess of said ring to index the same, a bellows engaging the pin to move the same, a chamber around the gyroscope adapted to be evacuated, a passage between said chamber and the bellows, a valve controlling the flow of fluid from the bellows to the chamber, a vent from the bellows to atmosphere and a second valve controlling the flow of fluid from this opening.

3. In control means for a gyroscope, a recessed centering ring located on a gimbal ring of said gyroscope, a pin axially movable into engagement with the recess of said ring to index the same, a bellows engaging the pin to move the same, a chamber around the gyroscope adapted to be evacuated, a passage between said chamber and the bellows, a valve controlling the flow of fluid from the bellows to the chamber, a vent from the bellows to atmosphere, a second valve controlling the flow of fluid from this vent and relay means for controlling the two valves.

4. In an indexing device for gyroscope including, a centering ring located on one of the gimbal rings of said gyroscope, recessed portions on said ring, a plurality of tapered pins axially movable to engage the recessed portions of said ring approximately simultaneously to index same, a bellows located below said ring and engaging said pins to move the same to index said ring, and a valve means for introducing air into said bellows at atmospheric pressure and separate valve means for exhausting said air at substantially below atmospheric pressure.

WALLACE W. PERKINS.
ALBERT W. FISCHER.

REFERENCES CITED

The following references are of record in the file of this patent:

UNITED STATES PATENTS

| Number | Name | Date |
|---|---|---|
| 1,114,431 | Bopp | Oct. 20, 1914 |
| 1,814,577 | Windle | July 14, 1931 |
| 1,996,896 | Bennett | Apr. 9, 1935 |
| 2,273,309 | Zand | Feb. 17, 1942 |